W. ARTHUR.
REGISTERING MECHANISM.
APPLICATION FILED APR. 29, 1916.
1,233,637.
Patented July 17, 1917.
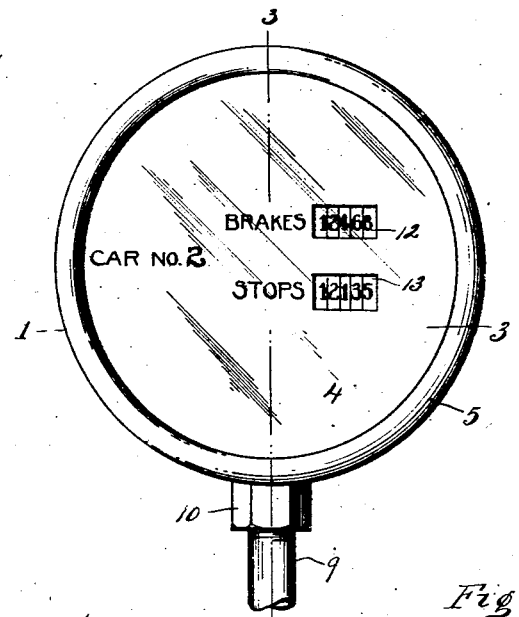
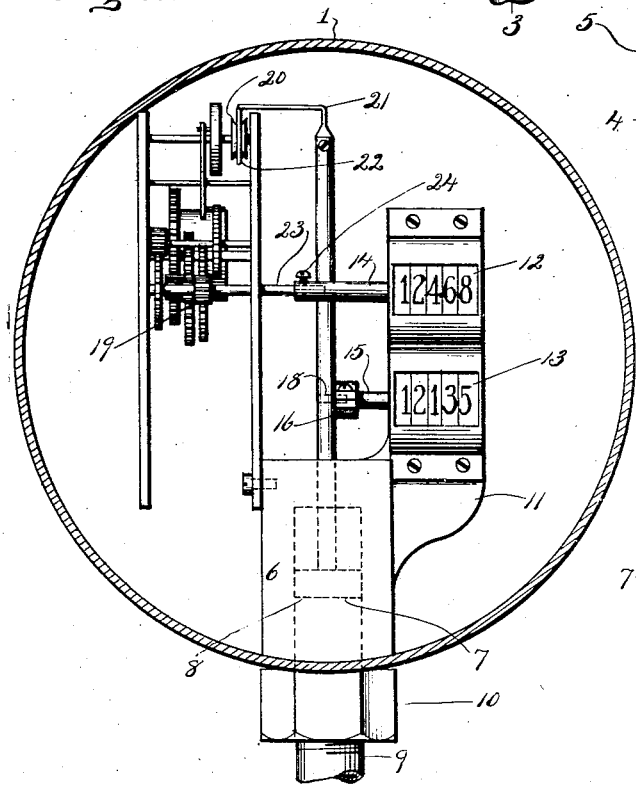
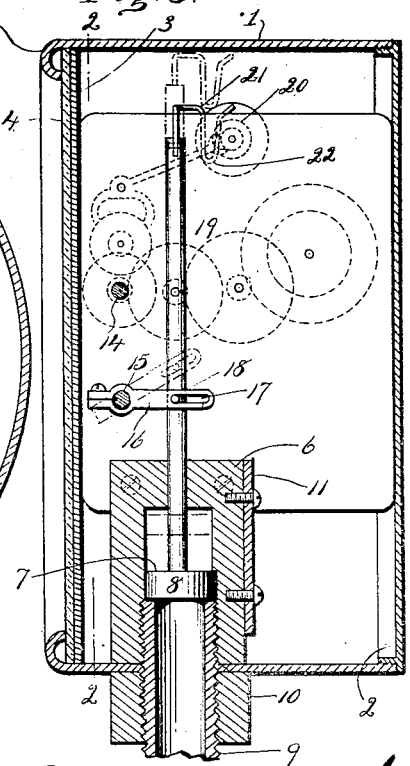
Inventor William Arthur
By Atty

UNITED STATES PATENT OFFICE.

WILLIAM ARTHUR, OF NEW HAVEN, CONNECTICUT.

REGISTERING MECHANISM.

1,233,637.

Specification of Letters Patent.

Patented July 17, 1917.

Application filed April 29, 1916. Serial No. 94,510.

*To all whom it may concern:*

Be it known that I, WILLIAM ARTHUR, a subject of George V, King of Great Britain, residing at New Haven, in the county of New Haven and State of Connecticut, have invented certain new and useful Improvements in Registering Mechanism, of which the following is a specification, reference being had therein to the accompanying drawings.

This invention relates to registering mechanisms and more particularly to a mechanism applicable to cars and the like for the purpose of determining the efficiency of the operator.

The primary object of the invention is to provide a registering mechanism which encourages conservation of power and equipment by not only registering the braking period; i. e., duration of time throughout which the brake is applied, but also by registering each and every brake application, to thus act as a complete and effective means of ascertaining efficiency, and afford to the management an indisputable basis for rewarding meritorious operators.

A further object of the invention is to provide a registering mechanism in which the two registers are in substantially a single line of vision so as to allow the operator to readily determine, from time to time, and at a glance, the exact nature of his individual record; to encourage the use of hand-brakes at the end of the run; to increase safety in operation and to decrease the number of stops and slowdowns.

The invention also aims to compactly assemble the parts and to provide a simple structure possessed of a minimum of parts which can be economically made, assembled, and applied to the usual car air brake systems in common usage.

Further and other objects inherent to the above primary objects will be later and more particularly specified in the course of the following detail description.

In the drawings:

Figure 1 is a front elevation of the invention;

Fig. 2 is a sectional view on line 2—2 of Fig. 3; and,

Fig. 3 is a sectional view on line 3—3 of Fig. 1.

In the operation of all traction units, steam, electric or other, it is important that energy be conserved. To run a car over a determined route requires the expenditure of a certain amount of power. Any excess over that amount is waste and is dissipated in the form of destructive frictional wear and tear on the brake shoes and the wheel treads. Thus any unnecessary number of brake applications and prolonged time of application, not only wastes energy, but is destructive as to the equipment in general and particularly as concerns the brake shoes and wheels.

Therefore the present invention aims to provide a means for registering not only each time the brake is operated, but also the time throughout which the brake is applied, to thus check not only unnecessarily lengthy braking periods, but also unnecessary times of brake application.

The invention aims first to encourage coasting since this necessarily involves less braking time.

Second, to check unnecessary stops and slow downs, for example the practice of one car closely following another.

Third, safety by lessening the danger of rear end collisions, since a motorman soon learns that if he runs his car too close to a preceding car, he is required to frequently and unnecessarily apply his brakes, which gives him a bad record on times of brake operations. It discourages speeding, which requires longer and more frequent brake applications, and encourages the use of hand brakes at the end of the run. Company rules in general require the operation of the hand brake at the end of the run, which is for the purpose of keeping the same limbered up. By operating the hand brake at the end of the run, the motorman saves a times-operated mark against his efficiency, and is thus given an incentive for doing that which if left undone is a source of trouble for those in charge. The invention also discourages the habit of what is commonly termed "fanning the air," which is that of throwing the brakes on and off in stopping, with consequent shaking up of the passengers, and in addition depreciation of the equipment, in general. Each time a brake is applied the times-operated register therefore registers against the motorman's record.

The invention is preferably embodied in a cylindrical case 1, closed at its ends by a cap 2, and a glass disk 4 held between bead 5, and a plate 3. A cylinder 6, projects through the base of the case and is screwed over the upper end of a pipe 9 and held rigid by a jam nut 10. The pipe 9 is secured to the piping of the air brake system so as to locate the case in full view of the car operator. A bracket 11, is secured to the cylinder 6, and carries in superposed relation a pair of dial wheels or counters 12 and 13, the latter mounted upon operating shafts 14 and 15 respectively. Any form of registering mechanism can be used capable of operation by the aforesaid shafts.

An arm 16 is fixedly secured to shaft 15 and has a slot 17 in which is received a pin 18 fixed on the rod 7 of a piston 8, which latter reciprocates within the cylinder 6, so that upon the in-stroke of the rod the shaft 15 and thereby the counters 13 will be actuated.

A clock mechanism 19, of any suitable form is arranged within the case and is equipped with a friction wheel 20, and the usual spring shaft 23. A resilient finger 21 preferably of U-form, as depicted in Fig. 3, has one arm secured to the piston rod and its opposite arm free and engaging the periphery of the wheel 20 with sufficient pressure to normally hold the wheel 20 against rotation when contacting therewith. Thus upon up movement of the rod 7 and therewith finger 21 the spring will rotate shaft 23 and thereby effect operation of the counter 12.

In order to positively assure starting of the clock mechanism, the spring arm 22 is made of such length so that during up or in movement of the piston it will tend to rotate the friction wheel 20.

When the brakes are off, no air pressure exists in the cylinder 6, but the instant of brake application, air enters the cylinder and acting upon piston 8, moves the latter upwardly. Upon release of the air brakes, the air pressure diminishes and the piston responds to the force of gravity and descends to initial position. Upon the up stroke of the piston the wheels of the register 13 are rotated indicating that the brake has been operated once. This fact may be ascertained or designated by employing the legend "Stops" or the like associated with the register 13. This register 13 therefore indicates the number of times the brake is operated, registering upon each operation. At the same time i. e., up stroke of the piston, the clock is started and continues in motion until the piston is lowered by the release of the air brakes and consequently relief of the air pressure in the cylinder 6. The legend "Brakes" or the like, is associated with the register 12 and indicates the duration of the braking period, or the time throughout which the brakes are maintained, applied or on. Therefore, as long as the brakes are kept on, the clock mechanism will operate and register accordingly on the register 12, the numerals of which latter may, if desired, designate seconds, minutes, or other divisions of time.

The present device, it will be therefore apparent, contemplates not only registering means for the braking period, but in addition register of each operation of the brake, with a dual purpose in mind, namely economy and safety. As concerns the first of these factors, economy, it will be apparent that the fewer the times of operation of the brake, the greater the saving in power necessary to start and the lessening of wear and tear on the equipment. The second factor, safety, is of vital importance, since one of the most disastrous of accidents is rear end collisions. For example, it often happens, that unless checked, motormen run their cars closely behind each other with the result that if the leading car makes an unexpected stop, there is danger of the following car running into the leading car, which has frequently happened. It has been found however that motormen if operating too close to the car in front, must frequently apply his brakes and such brake applications would be unnecessary provided the second car held back a greater distance. Obviously and ordinarily the car ahead will take on more passengers than the car following, consequently the car following will not only waste energy and depreciate the equipment, but in addition will be making stops which are not renumerative but a loss in several ways.

Putting a check upon the numbers of brake applications therefore encourages motormen to run at a same distance behind the preceding car. The provision of a check on the braking period, in addition to a check on the time of brake applications, affords a double check on the efficiency of motormen, since if one motorman employs a large number of brake applications and another motorman fewer times of brake applications, assuming of course the condition of service equal, but with a longer period of application, the latter fact is registered as well as the former. The two registers therefore are interdependent in the sense that regardless of whether the fault lies in duration of braking period or times of brake application the facts are accordingly and indisputably presented.

From the foregoing, it will be apparent that minor change and variations may be resorted to without departing from the essential feature of the invention, which in brief resides in two registers that are interallied so that one will indicate the number of times the brake is operated and the other the duration of application of the brake. Thus each register registers data pertaining to the same mechanism, (brake) so that efficiency can be rated by data obtained from each, and intentional or unintentional data giving a false and erroneous rating, prevented, such as is possible where times of brake operations or duration of braking periods are alone registered.

It will also be apparent from the foregoing that the piston rod on its retrogressive stroke will effect retrogressive operation of the times operated register, so as to take from the motorman's record each time he operates the brake.

What is claimed is:

1. A registering mechanism for determining the efficiency of motormen and the like, including a register for indicating each time the brake is applied, a second register for indicating the period throughout which the brake is kept applied, and means controlled by the pressure in the air brake system for controlling each of said registers upon each application of the brake.

2. A registering mechanism for determining the efficiency of motormen and the like, including a register for indicating each time the brake is applied, a second register for indicating the period throughout which the brake is kept applied, and means controlled by the pressure in the air brake system and including an element common to each of the registers and operatively connected to and for controlling each upon each application of the brake.

3. A registering mechanism for determining the efficiency of motormen and the like, including a register for indicating each time the brake is applied, a second register for indicating the period through which the brake is kept applied, means controlled by the pressure in the air brake system for positively controlling each of said registers upon each application of the brake, including a reciprocable element common to each register, and connections between the element and each register.

4. A registering mechanism for determining the efficiency of motormen and the like, including a pair of juxtaposed registers, a reciprocating element common to each register, means for controlling each register upon movement of the element connected thereto and to the respective registers, and means for reciprocating said element from the air brake system and upon each brake application.

In testimony whereof I have hereunto affixed my signature.

WILLIAM ARTHUR.